United States Patent [19]

Taguchi et al.

[11] 3,777,243
[45] Dec. 4, 1973

[54] POSITIONING CONTROL APPARATUS

[75] Inventors: Nobuo Taguchi; Takehiko Ono, both of Tokyo, Japan

[73] Assignee: Tokyo Shibaura Electric Company, Ltd., Kanagawa-ken, Japan

[22] Filed: Feb. 14, 1972

[21] Appl. No.: 225,888

[30] Foreign Application Priority Data
Feb. 18, 1971  Japan.................................. 46/7172

[52] U.S. Cl. ................................................ 318/621
[51] Int. Cl. ................................................ G05b 6/02
[58] Field of Search ..................................... 318/621

[56] References Cited
UNITED STATES PATENTS

| | | | |
|---|---|---|---|
| 3,465,276 | 9/1969 | Silva et al. | 318/621 X |
| 3,493,826 | 2/1970 | Wandrey | 318/621 X |
| 3,283,229 | 11/1966 | Lindahl | 318/621 X |
| 3,476,335 | 11/1969 | Andeen et al. | 318/621 X |
| 3,510,737 | 5/1970 | Brown et al. | 318/621 X |
| 3,555,391 | 1/1971 | Younkin | 318/621 X |

Primary Examiner—B. Dobeck
Attorney—Norman F. Oblon et al.

[57] ABSTRACT

A positioning control system for positioning a movable member includes a comparator for comparing a controlled variable with a command variable to provide an actuating or error signal. An electric controller provides an electrical manipulated variable signal from the actuating or error signal. A detector will detect when the actuating signal is smaller than a predetermined value to thereby cause the electric controller to change and thereby increase the lag characteristic thereof such that the movable member is quickly and accurately positioned.

5 Claims, 4 Drawing Figures

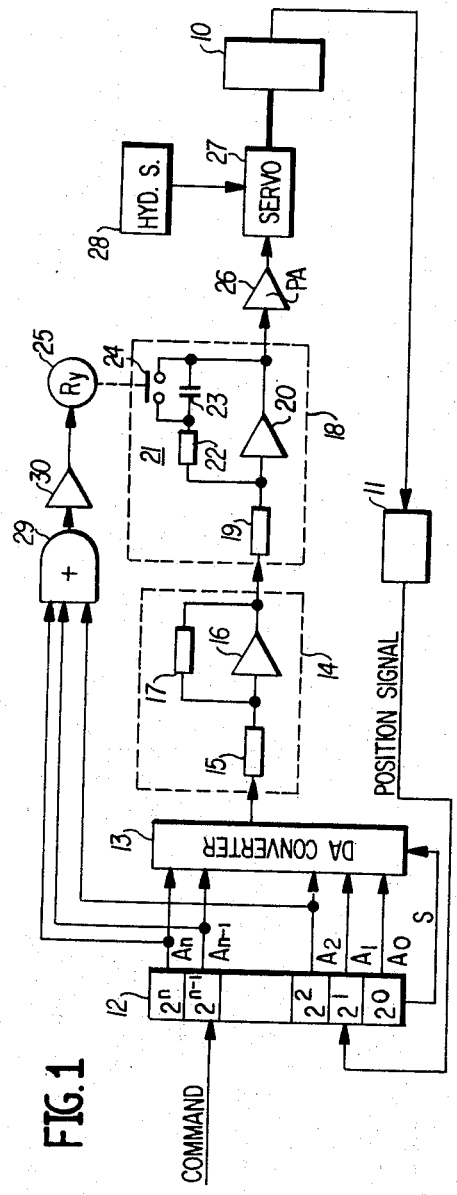
FIG. 1
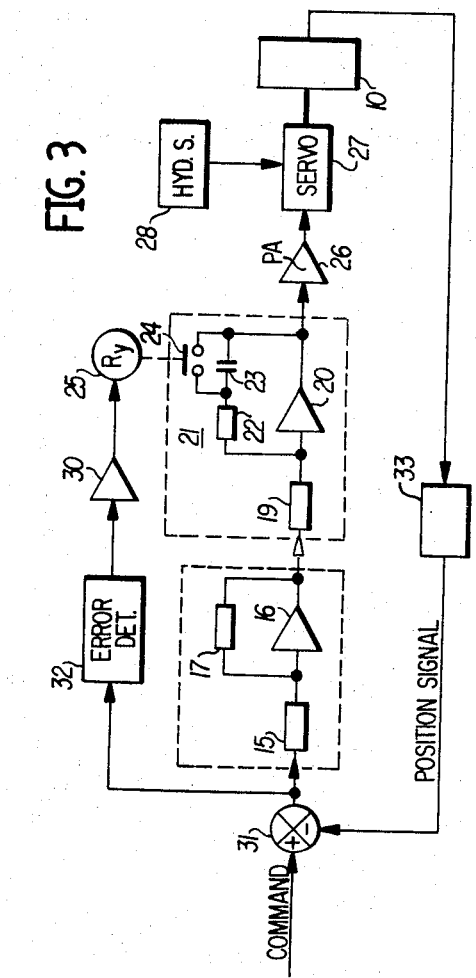
FIG. 3
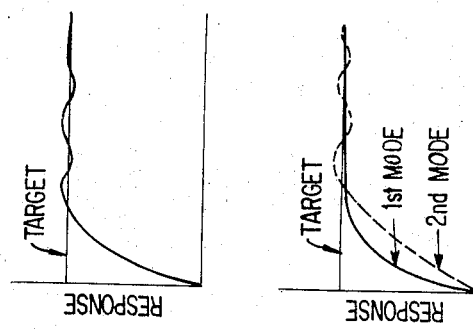
FIG. 2A
FIG. 2B

POSITIONING CONTROL APPARATUS

BACKGROUND OF THE INVENTION

1. Field Of The Invention

This invention generally relates to a positioning control apparatus and more particularly to a positioning control apparatus adapted for providing quick and accurate positioning of an object or movable member.

2. Description Of The Prior Art

Certain machines, such, for example, as an industrial manipulator or a robot, have movable members such as an arm portion and the like. Conventionally, these machines have employed an electro-hydraulic actuating system for controlling the movable members thereof. In such machines, a need exists for the quick and accurate positioning of the movable member over a long operating time. In an attempt to accomplish the above, particular consideration has been paid to the design of the electro-hydraulic system thereof. For example, in the electro-hydraulic system, an accurate servo-valve is used for converting an electric signal such as the magnitude of an electric current into a mechanical signal such as the flow rate of a hydraulic fluid. Moreover, the hydraulic fluid employed had good characteristics against variation with temperature and the like. However, even with the above, it was found impossible to completely eliminate the drift of the hydraulic system. Thus, because of this drift, a certain disturbance or extraneous input would exist in the hydraulic system of the positioning system. Such a distrubance has been known to cause a steady-state error in the accuracy of the positioning system.

On the other hand, from the point of view of economical efficiency, space factors and the like, it was desirable to use relatively small servo-valves, actuators operated thereby, and the like, for driving the relatively large movable member of the machine in response to an electrical signal. However, in positioning systems having an electro-hydraulic system wherein relatively small servo-valves and actuators are employed, it was impossible for the same to have a high gain. Moreover, by using relatively small components, there was a tendency to decrease the accuracy and to increase the time constant of the electro-hydraulic system.

Typically, the overall positioning system would include a comparator for developing an actuating or error signal from the command variable and the controlled variable which was compared therewith, an electric controller for developing an electric manipulated variable from the actuating signal, an electro-hydraulic servo-mechanism, and the object or movable member to be controlled by the servo-mechanism. In order to accurately effect the positioning control, it was necessary to make the loop gain in the overall positioning system as high as possible, yet maintain the stability thereof. As described above, the gain of the electro-hydraulic system was of a relatively low value so that the gain of the electric controller had to be high. However, by providing an electric controller having a substantially high gain, the stability of the overall positioning system would be adversely affected and actually reduced. Additionally, a lag or integral characteristic was usually provided in the electric controller to thereby substantially reduce the steady-state error which was chiefly caused by the extraneous input, such as the drift of the electro-hydraulic system. However, such an arrangement which provided the controller with an integrating operation would often result in there arising a relatively large lag of phase. This was particularly a problem at relatively low frequency ranges. Also, a relatively large overshoot in the movable member being controlled would occur. Such a lag of phase would result in a decrease in the speed of the positioning control apparatus, while the overshoot would result in a decrease in the accuracy of positioning.

SUMMARY OF THE INVENTION

Accordingly, it is an object of the present invention to provide a new and improved unique positioning control apparatus which is capable of quickly and accurately positioning a movable member.

It is another object of the present invention to provide a new and improved unique positioning control apparatus which is stable and has a relatively small overshoot.

One other object of the present invention is to provide a new and improved positioning control apparatus which includes an electric controller which is capable of changing the lag characteristic thereof at appropriate times.

Briefly, in accordance with the present invention, the foregoing and other objects are, in one aspect, attained by the provision of a comparator means for comparing a controlled variable with a command variable to produce an actuating or error signal and an electric controller for developing a manipulated variable from the actuating or error signal. Additionally, an electric-hydraulic means is provided for driving the movable member in response to the manipulated variable and a detecting means is provided for detecting when the actuating signal is smaller than a predetermined value to thereby cause the electric controller to increase the lag characteristic thereof.

BRIEF DESCRIPTION OF THE DRAWINGS

The present invention will be more fully understood from the following description when taken in connection with reference to the accompanying Drawings, wherein:

FIG. 1 shows a schematic block diagram of one preferred embodiment according to this invention;

FIGS. 2a and 2b show various operating responses useful in explaining the embodiment shown in FIG. 1; and, FIG. 3 shows a schematic block diagram of another alternative and preferred embodiment according to this invention.

DETAILED DESCRIPTION OF THE PREFERRED EMBODIMENTS

Referring now to the Drawings, wherein like reference numerals designate identical or corresponding parts throughout the several views, and more particularly to FIG. 1 thereof, wherein one preferred embodiment of a positioning control apparatus according to this invention is shown with an object or movable member to be positioned being indicated by a reference numeral 10.

An analogue signal corresponding to the position of the object or movable member 10 which may either be electrical or mechanical, is applied to a detector 11 which produces a digital position signal corresponding thereto. The digital position signal from the detector 11 represents a controlled variable and is fed back to a reversible counter 12.

The counter 12 is adapted to count up a command variable or instruction pulse train to the contents thereof and to count down the position pulses generated by the detector 11. In accordance therewith, a signal having a magnitude which is equal to the difference between the command position and the actual position of the object or movable member 10 is provided in digital representation as an actuating or error signal $A_0 2^0 + A_1 2^1 + A_2 2^2 + \ldots + A_n 2^n$. The digit lines $A_0$ to $A_n$ at the output of the counter 12 are connected to corresponding input terminals of a digital-to-analogue converter 13. A sign signal S is also applied from the counter 12 to the digital-to-analogue converter 13. An analogue actuating or error signal including a sign component is therby obtained at the output terminal of the converter 13. An amplifying device 14 having an input resistor 15, an amplifier 16 and a feedback resistor 17 is provided for amplifying the actuating or error output signal of the converter 13. The signal so amplified is then applied to an operational amplifying device 18 which includes an input register 19, a high gain amplifier 20, and a feedback element generally shown at 21. The feedback element 21 has a resistor 22, a condenser 23 which is serially connected to the resistor 22, and a normally open contact 24 which is connected in parallel with the condenser 23. The contact 24 is actuated by a relay 25 as will be explained in detail hereinafter.

The output of the operational amplifying device 18 is further amplified by a power amplifier 26 and is then applied to an electro-hydraulic servo-system 27 which includes a servo-valve and an actuator not shown. The servo-valve converts the output signal of the operational amplifier 18 into a corresponding flow rate of the hydraulic fluid supplied from a hydraulic fluid source 28. The hydraulic fluid thereby operates the actuator which, in turn, drives the object or movable member 10.

In order to detect when the magnitude of the positioning error is higher than that corresponding to a selected and desired value, such as three increments of the digital representation, an OR-gate 29 is provided and is arranged to receive at the input terminals thereof the signals appearing on the digit lines $A_2$ to $A_n$. The output of the OR-gate 29 is amplified by an amplifier 30 and is then supplied to the relay 25. Thus, when at least one of the inputs of the OR-gate 29 is of a high value, the same will produce a high output which is amplified by the amplifier 30 to cause relay 25 to operate. Accordingly, the relay 25 will operate so as to close the contact 24 during that period of time when the positioning error is of a value larger than that corresponding to three increments.

In operation, when a command such, for example, as 100 positive increments (this may mean, for example, a movement of the object or movable member 10 by 10 cm. in a forward direction if one increment corresponds to 1 mm.) is applied to the counter 12, the OR-gate 29 will produce a high output to cause the relay 25 to operate whereby the contact 24 thereof is closed. The closing of the contact 24 will short-circuit the condenser 23 and thereby remove any lag or integral characteristic of the operational amplifier 18. Accordingly, the object or movable member 10 to be positioned will be moved toward the desired target position in a manner having a much smaller controlling lag than that of the case where the operational amplifier has a lag characteristic. That is, the object or movable member 10 can be moved toward the target position with a relatively high speed.

Now, when the positioning error reaches to within three increments, the OR-gate 29 will stop generating a high output therefrom so that the relay 25 will be de-energized and thereby cause the contact 24 thereof to open. The condenser 23 will then be inserted into the feedback loop of the amplifier 20 whereby the operational amplifying device 18 will now have a lag characteristic. It should be understood that up until this time, the condenser 23 had no charge, since the same has been shunted or short-circuited by the contact 24. Thus, a smooth transfer or changeover operation from a first mode wherein the condenser 23 is removed to a second mode wherein the condenser 23 is inserted is obtained. In the second mode of operation, the object or movable member 10 is moved to the desired command position. Now, if it is realized that the transfer from the first mode of operation to the second mode of operation is performed in the vicinity of the target position, then it will be apparent that the characteristic of a smooth transfer serves to enable both a smooth and stable positioning of the object or movable member 10. The above described operation is illustrated in FIG. 2a.

In the second mode of operation, the controlling lag will not affect the positioning operation, since the second mode of operation is employed only in the vicinity of the target position. With regard to overshoot, the amount of the same is substantially negligible with the present invention, since the amount of overshoot generally depends on the characteristics of the system and the second mode of operation is employed only in the region of a small error signal. If the whole operation is performed by the second mode of operation, the object or movable member 10 to be positioned will be controlled as shown by the dotted line in FIG. 2b. The above discussion will be easily understood by comparing FIGS. 2a and 2b.

If the whole operation is performed by the first mode of operation, the object or movable member 10 to be positioned will be controlled as shown by the solid line in FIG. 2b. However, since a steady-state error usually occurs as a result of an extraneous input, such as the drift of the electro-hydraulic actuating system, it is noted that the second mode of operation must be employed in the region where the steady-state error may occur. In other words, the detecting means for controlling the relay 25 must be adjusted to satisfy the above requirement.

Referring now to FIG. 3, another preferred embodiment of this invention is shown as including an analogue comparator 31, an error detector 32 for producing an output when the error or actuating signal is larger than a predetermined value, and a position detector 33. The other portions of the embodiment of FIG. 3 are substantially the same as that shown in FIG. 1. In this embodiment, the command variable is supplied in the form of analogue signal. The error detector 32 may be constructed by using a Schmidt triggering circuit or the like.

Obviously, numerous modifications and variations of the present invention are possible in light of the above teachings. For example, an electronic switch may be readily used in place of the contact 24. It is therefore to be understood that within the scope of the appended claims, the invention may be practiced otherwise than as specifically described herein. What is claimed as new and desired to be secured by Letters Patent of the United States is:

1. A positioning control system for positioning a movable member comprising:
   comparator means for comparing a controlled variable with a command variable to produce an actuating signal;
   an electric controller for developing a manipulated variable in electrical representation from said actuating signal, said electric controller being able to increase a lag characteristic thereof;
   electro-hydraulic means for driving said movable member in response to said manipulated variable; and
   detecting means in a forward signal path for detecting when said actuating signal is smaller than a predetermined value to thereby cause said electric controller to increase said lag characteristic thereof.

2. A positioning control system according to claim 1, wherein said predetermined value is equal to or larger than a maximum value of any steady-state error which may occur.

3. A positioning control system according to claim 1, wherein said comparator comprises a reversible counter and a digital-to-analogue converter, and said detecting means detects a digital representation of said actuating signal from said counter.

4. A positioning control system according to claim 1, wherein said electric controller comprises an operational amplifier.

5. A positioning control system according to claim 4, wherein said operational amplifier comprises a feedback loop including a resistor and a condenser serially connected thereto, said condenser being arranged such as to be capable of being shunted in response to the operation of said detecting means.

* * * * *